United States Patent [19]

Coursant

[11] Patent Number: 4,677,981

[45] Date of Patent: Jul. 7, 1987

[54] DEVICE FOR THE EXAMINATION OF OBJECTS BY ULTRASONIC ECHOGRAPHY WITH ANGULAR FOCUSING

[75] Inventor: Roger H. Coursant, Paris, France

[73] Assignee: U.S. Philips Corporation, New York, N.Y.

[21] Appl. No.: 778,634

[22] Filed: Sep. 20, 1985

[30] Foreign Application Priority Data

Sep. 25, 1984 [FR] France ................................ 84 14682

[51] Int. Cl.$^4$ ............................................. A61B 10/00
[52] U.S. Cl. ..................................... 128/660; 73/628; 310/358
[58] Field of Search .................. 128/660; 73/625, 628; 310/334, 358, 359, 317

[56] References Cited

U.S. PATENT DOCUMENTS 4,145,931  3/1979  Tancrell ............................... 128/660
4,533,849  8/1985  Schnell ................................ 310/358

Primary Examiner—Kyle L. Howell
Assistant Examiner—Ruth S. Smith
Attorney, Agent, or Firm—Jack E. Haken

[57] ABSTRACT

A device for examining objects by ultrasonic echography comprising a focusing network of n ultrasonic transducers and in which the ultrasonic transducers $(a, b, c, \ldots i, \ldots, n-1, n)$ are made of an electrostrictive material with non-remanent polarization, and the said polarization is effected by a polarization stage comprising: (1) a source (501) of p polarization direct voltages, (2) a demultiplexing and branching circuit (502) receiving, on the one hand, the p polarization voltages and, in the other, combinations of m bits selecting the said voltages in order to supply them to the transducers, (3) a circuit for the determination of a law of sensitivity (503), consisting of a counter (522) whose number of states corresponds at least to the numbers of directions to be explored and of a memory (521), intended to provide the n respective digital combinations corresponding to each state of the counter, and (4) a sequencer (520).

1 Claim, 9 Drawing Figures

DEVICE FOR THE EXAMINATION OF OBJECTS BY ULTRASONIC ECHOGRAPHY WITH ANGULAR FOCUSING

The present invention relates to a device for the examination of objects by ultrasonic echography comprising a focusing network of n ultrasonic transducers linked to a transmission stage for the repeated transmission of ultrasonic waves to the region to be explored and a reception stage for the processing of the return echoes received. A device of this kind can be used, for example, in the medical field for the examination of biological tissues.

The U.S. Pat. No. 2,875,355 describes a focusing ultrasonic transducer which, to enable the said focusing, is composed of adjacent zones polarised in opposite ways. The dimensions of the zones are chosen so that the succession of polarisations with opposite signs in fact permits, on the principle of Fresnel's combinations of zones, an average shift of one half-wavelength between the ultrasonic paths starting from two successive zones, the focusing thus obtained being of the spherical or cylindrical type.

The phase law corresponding to this mode of polarisation is shown in FIG. 1 accompanying the present application. However, observance of a phase law of this kind permits only a relatively approximate focusing since the shift by a half-wavelength is in reality necessary only between the central positions of two successive zones of opposite polarity, the shifts between the points located between these central positions having to be lower and to vary continuously between the value zero and one half-wavelength. However, since a whole zone presents the same polarisation of a given sign and the whole adjacent zone the same polarisation of opposite sign, this condition of progressiveness of shifts is not observed.

This disdavantage becomes still more obvious when it is desired to apply oblique focusing. In fact, it is geometrically obvious that the more marked the obliquity of the focusing beam is in relation to the perpendicular to the plane of the transducer(s) used, the more the real focusing conditions are removed from the optimum focusing obtained when the progressivity condition is observed.

The aim of the invention is to propose a tissue-examination device overcoming that disadvantage.

To that end the device according to the invention is characterised by the fact that:

(A) the ultrasonic transducers are made of an electrostrictive material with non-remanent polarisation;

(B) the said polarisation is achieved via a polarisation stage consisting of the following circuits:

(1) a source of a p polarisation direct voltages;

(2) a demultiplexing and branching circuit consisting of n demultiplexers each receiving, on the one hand, the p polarisation direct voltages, and, on the other, the combination of m bits selecting one of the said voltages, and supplying, via a polarisation resistor in series, the said selected voltage to the ultrasonic transducer associated individually with the demultiplexer;

(3) a circuit for determination of a law of sensitivity corresponding to two states of phase and to p/2 or (p+1)/2 states of amplitude when p is even or odd, respectively, the said circuit consisting of a counter, whose number of states corresponds at least to the number of different directions in which it is desired to perform an examination with focusing of the ultrasonic waves, and of a memory intended to supply to the n demultiplexers, in response to any state of the counter, n respective digital combinations corresponding to the said state and indicating to each demultiplexer that one of the direct voltages which it has to select for polarisation of the transducer which is associated with it;

(4) a sequncer consisting essentially of the clock circuit intended to fix the duration of the periods of transmission and reception and the rate of change of state of the counter.

In the device thus proposed the use of transducers made of an electrostrictive material and the polarisation of these with the aid of a polarisation stage of an original structure make it possible to achieve an extremely accurate oblique focusing. The theoretical phase law to which corresponds the exact attainment of Fresnel-zone networks, i.e. perfect focusing with the necessary exact progressiveness of shifts between successive transducers, is shown in FIG. 2. The use of the polarisation stage according to the invention makes it possible to impose on each transducer in the netwokr, in each of its two possible states of opposite polarity, a law of discrete variation of amplitude enabling the disadvantage mentioned above of the approximate focusing with two states of phase to be effectively reduced. More precisely, the focusing thus obtained is nearer that which is theoretically necessary as the number p of direct voltages for polarisations, positive or negative, supplied by the source of direct voltages to obtain these different amplitudes is higher.

The features and advantages of the invention will now emerge in a more detailed fashion in the description which follows and the attached drawings, which are given by way of non-limitative examples and in which:

FIGS. 1 and 2 are curves for P=f(D) where P represents the phase and D the distance considered from the central part of the network of transducers, respectively showing a simplified phase law which permits an approximate attainment of a Fresnel-zone network with the aid of a network of transducers with two states of polarisation, and the theoretical phase law which enables it to be obtained exactly;

FIG. 3 shows an example of embodiment of the device according to the invention,

FIGS. 4a to 4d are time-sequence diagrams respectively showing the variation of the periodical signal (electric voltage) defining the cadence of the transmission-reception cycles, the form of the delayed periodical signal actually fed to the generator of electrical excitation of the transducers, the shape of the periodical signal fixing the duration of transmission in the transmission-reception signal, and the behaviour of the electrical voltage at the terminals of one of the ultrasonic transducers in the event of a change of polarity at instant $t_3$;

Figure 3:
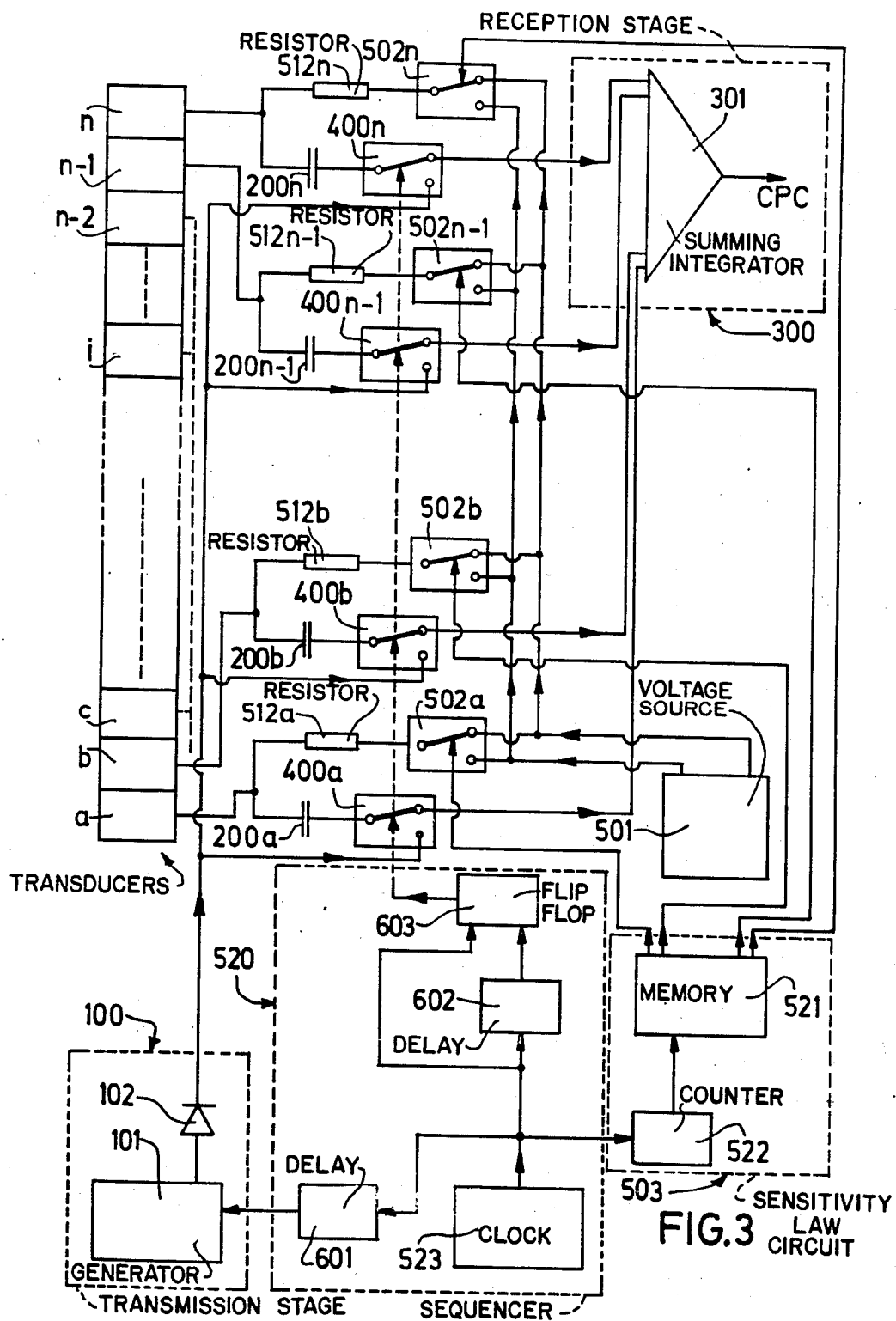

The device according to the invention comprises—see FIG. 3—on the one hand a network of n ultrasonic transducers a, b, c, . . . , i, . . . n−1, n, e.g. 32 or 64. These transducers are arranged in the form of a linear row of parallelepipedal transducer elements made of an electrostrictive material with (ferro-electric) polarisation which is non-remanent (i.e. a material whose transducing sensitivity is directly linked to the value of the polarisation voltage which is applied to it and disappears simultaneously with the latter). They may, for example, be ceramics doped with lead niobate and magnesium such as those described in the article by S. J. Jang et al., IEEE Ferroelectrics Symposium, vol. 27, 1980, pp. 31-34.

Figure 4A:
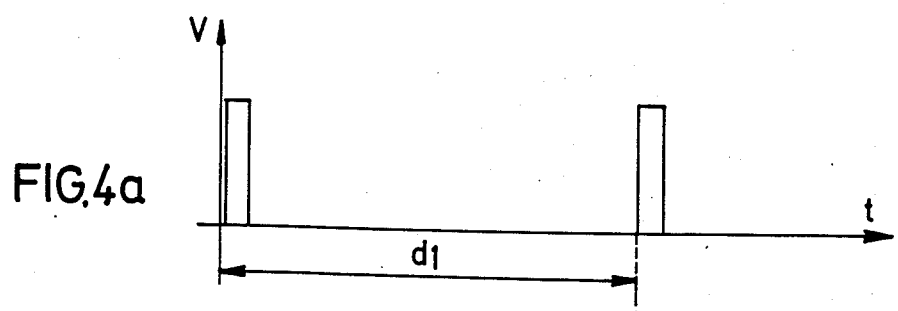
Figure 4B:
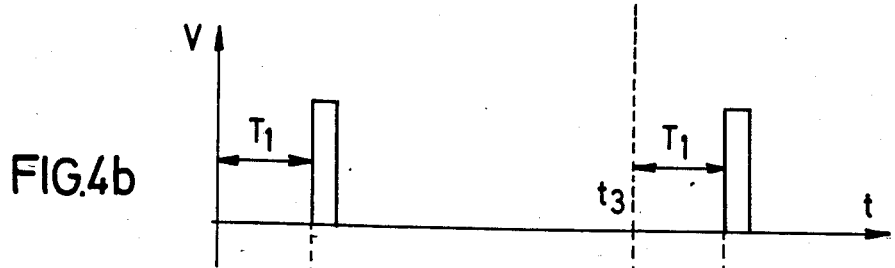
Figure 4C:
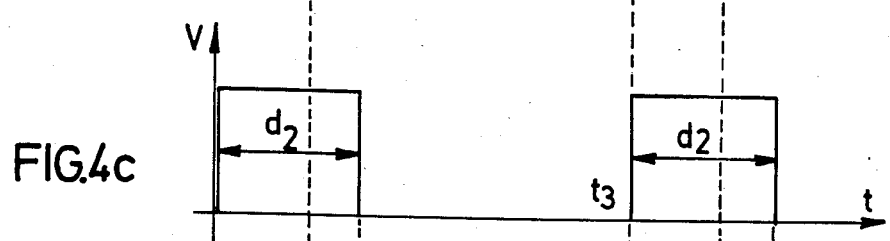

The device also comprises a transmission stage 100 consisting of an electrical excitation generator 101, and a diode 102 in series with the latter to give the said transmission stage high impedance in relation to the transducer elements, n capacitors 200a to 200n in parallel inserted between the output of the transmission stage and each of the n transducers, and a reception stage 300, comprising a summing integrator 301 receiving the n reception signals supplied by the n transducers and a conventional echographic-signal processing circuit CPC, the latter itself comprising, for example, an amplifier, an automatic gain control and a storage and/or display device. Switches 400a to 400n located between the output of the transmission stage 100, the capacitors 200a to 200n and the n inputs of the summing integrator 301 of the reception stage permit the separation of the transmission and reception stages. These switches flip and flop at the rate of the periodic signal in FIG. 4c described below and in particular prevent "blinding" of the reception stage by the transmission stage.

The device finally includes a polarisation stage consisting of a source of polarisation voltages 501, a demultiplexing and branching circuit 502, a circuit for the determination of the sensitivity law 503, and a sequencer 520. The polarisation-voltage source 501 is capable of supplying p distinct polarisation direct voltages, positive or negative, corresponding to the p possible polarisation states which it is desired to apply to the n electrostrictive transducers. In the description which follows it will be assumed, for the purpose of simplifying the figures, that there are only two possible states of polarisation, corresponding, for example, to two polarisation voltages of +500 volts and −500 volts, but the invention may be applied in the same manner when a law of sensitivity with p states is applied to the n transducers in order to permit more accurate focusing as has been seen above.

The demultiplexing and branching circuit 502 comprises n demultiplexers 502a to 502n. These demultiplexers receive on the one hand the p possible polarisation voltages (in the example described p=2 and the demultiplexers are then reduced to simple switches) supplied by the source 501 and, on the other hand, a combination of m bits fixing for the electrostrictive transducer concerned that one of the p polarisation direct voltages which it will receive and also, consequently, fixing the sensitivity of this transducer. If p=2, m=1 will be sufficient to express two possible states; if p=3 or p=4, m=2 will make it possible to denote the three or four corresponding states, and so on. The demultiplexing and branching circuit 502 has at the output of the n demultiplexers 502a to 502n an equal number of resistors 512a to 512n at the input of the n lines leading to the n transducers. In the example described in the value of these n polarisation resistors has been chosen at approximately 1000 ohms.

Figure 5:
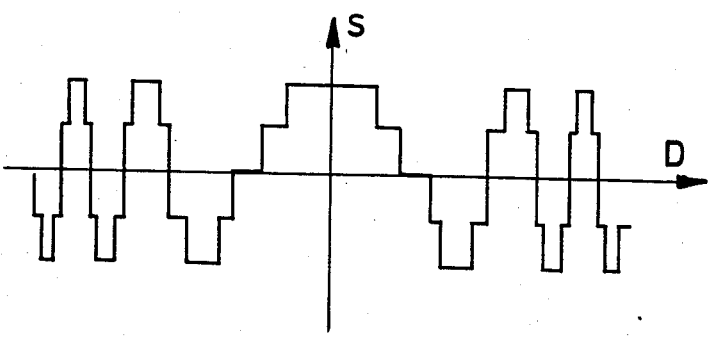
FIG. 5 shows the form of the law of sensitivity S which can be obtained if five possible polarisation direct currents are available and which makes it possible to obtain a two-state phase law and a three-state amplitude law.

The circuit 503 for determination of the law of sensitivity makes it possible to fix the obliquity of the focusing beam and the combination of m bits selecting the polarisation voltage applied individually to each of these transducers. The sensitivity law corresponds to phase states and to p/2 amplitude states when p is even or to (p+1)/2 amplitude states when p is odd (in the case of FIG. 5, p=5 and there are three possible amplitude states). The digital combination of m bits associated with the sensitivity law corresponding to the desired obliquity is supplied by a memory 521, e.g. of the ROM or PROM type, previously loaded with the values corresponding to the best possible expression of the said law of sensitivity, taking into account the number of distinct polarisation voltages supplied by the source 501. This memory is connected to a counter 522 whose number of states is the desired number of different obliquities, e.g. 128, and whose input is, in turn, controlled by a clock circuit 523 delivering the signal shown in FIG. 4a: the period $d_1$ of the periodic signal thus delivered corresponds to the duration of an ultrasonic transmission-reception cycle for a predetermined obliquity.

The clock circuit 523 forms part of the sequencer 520 and controls not only the counter 522 but also, in the sequencer, delay circuits 601 and 602. The delay circuit 601, located between the clock circuit 523 and the electrical excitation generator 101, gives the signal in FIG. 4a a delay $T_1$ (for the new signal thus generated, see FIG. 4b) which corresponds to the recovery time necessary to trigger the transmission of ultrasonic waves while the polarisation of the transducers is effective. The delay circuit 602 fixes the duration $d_2$ of operation in the transmitting mode. The pulse of corresponding duration, shown in FIG. 4c and with a repetition period equal to that of the pulses of duration $d_1$ in FIG. 4a (e.g. 1 millisecond in the example considered) is provided by the flip-flop circuit 603. Of the inputs to this flip-flop circuit one is connected directly to the output of the clock circuit 523, e.g. for the arrival of the pulse at the higher level, and the other connected to this same output but via the delay circuit 602 for the opposite change-over (return to the lower level of the pulse in the example considered). It is this periodic signal of FIG. 4c which is sent to switches 400a to 400n inserted between the transmission and reception stages 100 and 300 in order to provide the automatic control of the operation of the examination device in the transmission or reception mode.

Figure 4D:
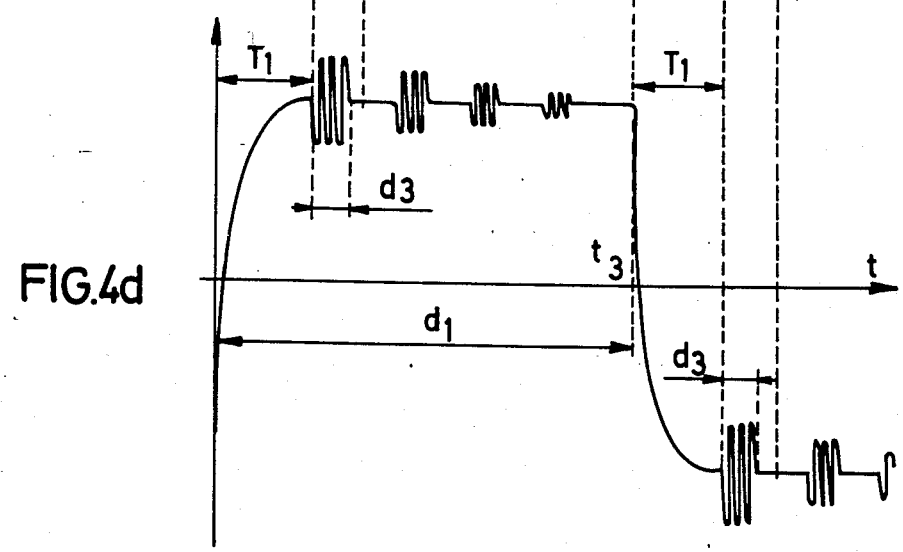

FIG. 4d shows the form of the electrical voltage at the terminals of a transducer in the case of a law of two-state sensitivity given definite form by the existence of two possible polarisation voltages. Shown in FIG. 4d are the delay time $T_1$ corresponding to the recovery time needed for the effective triggering of the transmission of ultrasonic waves, the duration $d_1$ of the transmission-reception cycle, and the duration $d_2$ of operation in the transmitting mode, and echoes originating from the structure examined are displayed on the electrical excitation signal.

The present invention is, of course, not limited to the example of embodiment described and shown, on the basis of which variants may be suggested without exceeding the framework of the invention. In particular, it has been shown that the invention, described for the purpose of simiplification for a two-state sensitivity law, is applicable in the completely general case of a p-state law, and this application will be briefly presented below.

Figure 1:
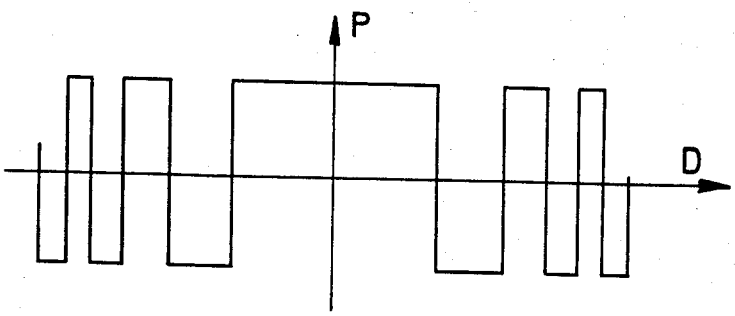
Figure 2:
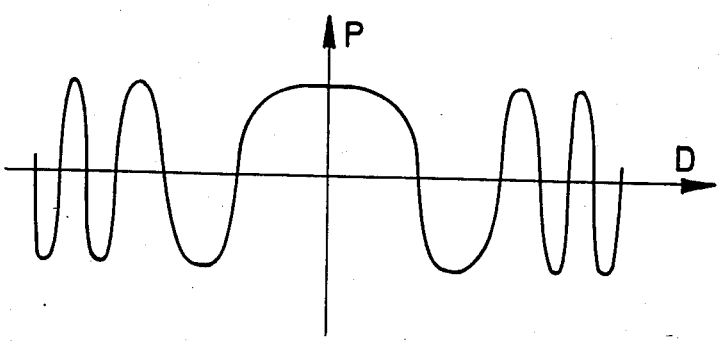

In theoretical phase law to which perfect focusing would correspond has been shown in FIG. 2 and its analytical translation is given by the expression $Y = \cos \alpha x^2$ where $\alpha = \pi/(\lambda \cdot f)$ ($\lambda$ being the wavelength associated with the frequency of the generated ultrasonic waves, i.e. with the operating frequency of the transducers, and f being the focal distance). A two-state phase law constituted an approximation of it which is better according as the amplitude law associated with it has more quantification levels and consequently makes it possible to reduce that much better the effect of harmonic frequencies. If, for example, we choose $p = 5$, i.e. five levels of sensitivity thanks to a two-state phase law and a three-state amplitude law, this sensitivity law is represented by the curve in FIG. 5.

Figure 6:
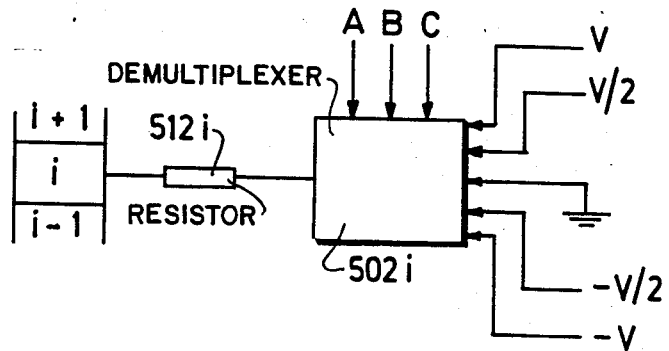
FIG. 6 shows an example of a demultiplexer in the case of a sensitivity law with five possible states of polarisation.

The circuits of the reception stage are then naturally a little more complicated than in the example previously described. On the one hand, the source of polarisation voltages 501 must now deliver four direct voltages: V, V/2, $-$V/2, and $-$V, the zero voltage to which the fifth polarisation state corresponds being obtained simply by earthing. On the other hand, the memory word corresponding to any polarisation state transmitted from meory 521 to any 502i of demultiplexers is longer, which means a greater memory capacity. For five stages it would be possible to choose, for example, three-bit words: 000 for V, 001 for V/2, 010 for 0 volts, 011 for $-$V/2 and 100 for $-$V. The n words addressed respectively to each of the n demultiplexers 502a to 502n of the demultiplexing and branching circuit 502 are chosen from among these five expressions and the binary triplet ABC constituting these words is addressed to each demultiplexer in accordance with the diagram in FIG. 6.

The following fact will also be noted, namely that the more pronounced the obliquity of the focusing beam is, the more shifted in time in relation to one another the ultrasonic waves transmitted by two individual transducers in the network arrive at any focusing point located on the path of the beam. The result is that, during any half-period $d_1$ in which the voltage seen in FIG. 4 corresponds to a same determined state of polarisation, the monochromatic (or quasi-monochromatic) excitation signal transmitted has to be so for a duration $d_3$ which is sufficient for the signal transmitted by the transducer nearest to the focusing point and thus arriving first at this point to be still present at this same point, when, in turn, the signal transmitted by the most distant transducer arrives. The existence of focusing is subject to that condition.

What is claimed is:

1. A device for the examination of objects by ultrasonic echography comprising a focusing network of n ultrasonic transducers associated with a transmission stage for the repeated transmission of ultrasonic waves across the region to be explored and with a reception stage for the processing of the return echoes received, wherein:

said ultrasonic transducers are made of an electrostrictive material with non-remanent polarisation and further comprising
  (1) a source of p polarisation direct voltages;
  (2) demultiplexing and branching circuit means which include n demultiplexers each of which receives the p polarisation direct voltages selects one of the said voltages and supplies, via a series polarisation resistor the selected voltage to one of said ultrasonic transducers;
  (3) a circuit means which determines a law of sensitivity corresponding to two phase states and to p/2 or (p+1)/2 amplitude states when p is even or odd, respectively, said circuit means comprising a counter having a number of states which correspond at least to the number of different directions in which it is desired to perform an examination by focusing the ultrasonic waves, and a memory which supplies to the n demultiplexers, in response to any particular state of the counter, n respective digital combinations corresponding to the said state thereby indicating to each demultiplexer one of the direct voltages which it has to select for the polarisation of the transducer associated with it;
  (4) sequencer means comprising a clock circuit which fixes the duration of the transmission and reception periods and the rate of change of state of the counter.

* * * * *